US012404106B2

(12) United States Patent
Lu et al.

(10) Patent No.: US 12,404,106 B2
(45) Date of Patent: Sep. 2, 2025

(54) MERGING PROCESSING SYSTEM, METHOD AND DEVICE

(71) Applicant: BEIJING GEEKPLUS TECHNOLOGY CO. LTD, Beijing (CN)

(72) Inventors: Honghan Lu, Beijing (CN); Kai Liu, Beijing (CN); Kaozhun Li, Beijing (CN); Mengdi Wang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 638 days.

(21) Appl. No.: 17/754,863

(22) PCT Filed: Oct. 13, 2020

(86) PCT No.: PCT/CN2020/120555
§ 371 (c)(1),
(2) Date: Apr. 14, 2022

(87) PCT Pub. No.: WO2021/073489
PCT Pub. Date: Apr. 22, 2021

(65) Prior Publication Data
US 2023/0067416 A1 Mar. 2, 2023

(30) Foreign Application Priority Data
Oct. 15, 2019 (CN) .......................... 201910980221.2

(51) Int. Cl.
B65G 1/137 (2006.01)
B65G 1/04 (2006.01)
(Continued)

(52) U.S. Cl.
CPC ......... B65G 1/1371 (2013.01); B65G 1/0485 (2013.01); B65G 1/0492 (2013.01);
(Continued)

(58) Field of Classification Search
CPC .. B65G 1/1371; B65G 1/1378; B65G 1/0485; B65G 1/0492; B65G 1/065;
(Continued)

(56) References Cited

U.S. PATENT DOCUMENTS 5,273,392 A * 12/1993 Bernard ............... B65G 1/0485
198/346.2
5,472,309 A * 12/1995 Bernard, II .......... B65G 1/0485
414/807
(Continued)

FOREIGN PATENT DOCUMENTS

| CN | 105398802 A | 3/2016 |
| CN | 106429148 A | 2/2017 |

(Continued)

OTHER PUBLICATIONS

European Search Report dated Nov. 16, 2022 from European Application No. 20905037.6.
(Continued)

Primary Examiner — Thomas Randazzo
(74) Attorney, Agent, or Firm — Hodgson Russ LLP

(57) ABSTRACT

A merging processing system, method and device. Said method comprises: determining turnover boxes to establish a correlation between the turnover boxes and the collection; box supply lines conveying the turnover boxes from sorting positions to a pickup position; the handling device moving the turnover boxes to a temporary storage region, and uploading to a control center; the control center determining a correlation between the turnover boxes and the temporary storage positions, when it is determined that all the turnover boxes of the collection to be merged are moved to the temporary storage region, controlling the handling device to move the turnover boxes of the collection to be merged to a merging processing station; and the handling device successively moving the turnover boxes corresponding to the same (Continued)

collection to be merged to the merging processing station, and performing merging on the collection to be merged.

20 Claims, 8 Drawing Sheets

(51) Int. Cl.
  *B65G 1/06* (2006.01)
  *G06Q 10/087* (2023.01)
(52) U.S. Cl.
  CPC ............ *B65G 1/065* (2013.01); *B65G 1/1373* (2013.01); *B65G 1/1378* (2013.01); *G06Q 10/087* (2013.01)
(58) Field of Classification Search
  CPC .. B65G 2201/025; B65G 1/04; B65G 1/1373; G06Q 10/087; G06Q 10/083
  See application file for complete search history.

(56) References Cited

U.S. PATENT DOCUMENTS

| | | | |
|---|---|---|---|
| 2006/0195348 | A1 | 8/2006 | Peterkofsky et al. |
| 2012/0306626 | A1* | 12/2012 | Abe ................... B65G 1/0421 340/10.4 |
| 2014/0303770 | A1 | 10/2014 | Wend et al. |
| 2016/0107838 | A1* | 4/2016 | Swinkels ............ B65G 1/1373 414/273 |
| 2018/0186572 | A1* | 7/2018 | Issing ................ B65G 1/1375 |
| 2018/0290829 | A1 | 10/2018 | Schroepf et al. |
| 2020/0039747 | A1* | 2/2020 | Ahmann ............ B65G 1/1375 |
| 2020/0279217 | A1* | 9/2020 | Gravelle .......... G06Q 10/06316 |
| 2021/0354921 | A1* | 11/2021 | Zheng ................ B65G 1/1378 |
| 2023/0271785 | A1* | 8/2023 | Gravelle ............ B65G 1/1378 |

FOREIGN PATENT DOCUMENTS

| | | | | |
|---|---|---|---|---|
| CN | 107918839 A | 4/2018 | | |
| CN | 109636269 A | 4/2019 | | |
| CN | 109850460 A | 6/2019 | | |
| CN | 208932210 U | 6/2019 | | |
| CN | 109978423 A | 7/2019 | | |
| CN | 110097414 A | 8/2019 | | |
| CN | 110498172 A | 11/2019 | | |
| CN | 110775496 A | 2/2020 | | |
| DE | 102011104511 | 10/2012 | | |
| DE | 102013206240 A1 | * | 10/2014 | ........... B65G 1/0457 |
| EP | 2407845 A1 | 1/2012 | | |
| EP | 2746194 A1 | 6/2014 | | |
| EP | 3943420 A1 | 1/2022 | | |
| JP | H08244919 | 9/1996 | | |
| JP | 2012162376 | 8/2012 | | |
| JP | 2015048171 | 3/2015 | | |
| JP | 2018047997 | 3/2018 | | |
| KR | 1020180102120 | 9/2018 | | |
| WO | 2010118412 A1 | 10/2010 | | |

OTHER PUBLICATIONS

International Search Report dated Jan. 14, 2021 from corresponding PCT Application No. PCT/CN2020/120555.
JPO, Office Action for JP Application No. 2022-521506, Aug. 6, 2024.
KIPO, Office Action for KR Application No. 10-2022-7013036, Oct. 8, 2024.
KIPO, Office Action for KR Application No. 10-2022-7013036, Jul. 1, 2025.

* cited by examiner

MERGING PROCESSING SYSTEM, METHOD AND DEVICE

The present application claims priority to Chinese Patent Application No. 201910980221.2, titled "MERGING PROCESSING SYSTEM, METHOD AND DEVICE FOR COLLECTION ORDER", filed on Oct. 15, 2019 with the National Intellectual Property Administration, PRC, which is incorporated herein by reference in its entirety.

FIELD

The present disclosure relates to the technical field of warehousing and logistics, and in particular to a merging processing system, method and device.

BACKGROUND

At present, with the rapid development of the logistics industries, the size of logistics parks is increasing. Limited by the size of each warehouse, multiple partitions (that is, multiple warehouses) are usually established in existing logistics parks to store items, so as to meet the storage capacity requirements of the logistics parks. With the emergence of multiple partitions, in order to improve the efficiency of delivery, the control center will first generate a collection order including multiple orders according to an order purpose, item types and other factors, receive all the items in the collection order from each partition at a merging operation region, and transport the items corresponding to the collection order to a sorting region for sorting and packaging.

In the conventional art, a process of obtaining items from multiple partitions according to information of the collection order is called merging. At present, common merging processing mainly rely on roller line merging systems.

Specifically, the roller line merging system transports the turnover containers sent from different partitions through the roller line to each branch line via a bus line, and one branch line is responsible for processing merging of items in a collection order, as shown in FIG. 1. Since one branch line is responsible for processing one collection order, the number of branch lines in the roller line merging system determines an upper limit of the number of collection orders that may be processed for merging. Moreover, since the length of the branch line is limited, there is also an upper limit on the number of turnover containers that may be temporarily stored on the branch line, thus limiting the number of turnover containers that may be included in a collection order. When the logistics park is expanded and the number of partitions exceeds the number of turnover containers that may be temporarily stored on the branch line, there may result in a failure to process order merging.

The existing systems for merging processing of collection orders generally rely on more complex hardware equipment (such as roller lines, elevators, and the like), which needs to consider a balance between efficiency and space utilize rate, resulting in a great difficulty in subsequent expansion or adjustment of the system. This makes it easy to generate aggregated orders that are difficult to process during peak periods, resulting in low processing efficiency and cost waste due to idle operating systems.

SUMMARY

A merging processing system and method are provided according to the embodiments of the present disclosure, so as to ensure the confidentiality and security of distribution regions during a logistics distribution process.

In a first aspect, a merging processing system is provided according to an embodiment of the present disclosure, the system includes: a control center, a temporary storage region, a container supply line, and a transporting device. The control center is configured to: determine, for each to-be-merged collection, turnover containers storing items corresponding to the to-be-merged collection; establish a correspondence between the turnover containers and the to-be-merged collection; and control the container supply line to provide the turnover containers. The container supply line is configured to transport each of the turnover containers from a corresponding sorting position to one of pickup positions where the transporting device obtains the turnover container. The transporting device is configured to transport the turnover container provided by the container supply line to the pickup position to the temporary storage region. The temporary storage region is configured to place the turnover container obtained by the transporting device from the container supply line. The control center is further configured to: determine a correspondence between the turnover container transported by the transporting device and a temporary storage position in the temporary storage region; and control, according to the correspondence between the turnover containers and the to-be-merged collection and in a case of determining that the turnover containers corresponding to the to-be-merged collection are transported to the temporary storage region, the transporting device to transport the turnover containers corresponding to the to-be-merged collection to a merging processing station. The transporting device is further configured to successively transport, under control of the control center, the turnover containers corresponding to the to-be-merged collection to the merging processing station to perform merging for the to-be-merged collection.

In a second aspect, merging processing method is provided according to an embodiment of the present disclosure, which includes:

determining, by a control center for each to-be-merged collection, turnover containers storing items corresponding to the to-be-merged collection, and establishing a correspondence between the determined turnover containers and the to-be-merged collection;

controlling a container supply line to provide the turnover containers;

controlling a transporting device to transport, for each of the turnover containers provided by the container supply line, the turnover container to a temporary storage region; and controlling the transporting device to transport each of the turnover containers corresponding to the to-be-merged collection to a merging processing station in a case of determining that the turnover containers corresponding to the to-be-merged collection are transported to the temporary storage region according to the correspondence between the turnover containers and the to-be-merged collection and a correspondence between the temporary storage position and the turnover container, and performing merging for the to-be-merged collection.

In a third aspect, a merging processing device is provided according to an embodiment of the present disclosure, which includes: an order determination module, a container supply module, a data cache module, and a merging processing module. The order determination module is configured to determine, by a control center for each to-be-merged collection, turnover containers storing items corresponding to the to-be-merged collection, and establish a correspondence between the determined turnover containers and the to-be-merged collection. The container supply module is configured to control a container supply line to provide the turnover containers. The data cache module is configured to control, for each of the turnover containers provided by the container supply line, a transporting device to transport the turnover container to a temporary storage region, and determine a correspondence between the turnover container and a temporary storage position of the temporary storage region. The merging processing module is configured to control the transporting device to transport each of the turnover containers corresponding to the to-be-merged collection to a merging processing station in a case of determining that the turnover containers corresponding to the to-be-merged collection are transported to the temporary storage region according to the correspondence between the turnover containers and the to-be-merged collection and the correspondence between the temporary storage position and the turnover container, and perform merging for the to-be-merged collection.

In a fourth aspect, a computer-readable storage medium is provided according to an embodiment of the present disclosure, on which a computer program is stored, and the program, when executed by a processor, performs any of the above merging processing methods.

With the above at least one technical solution according to the embodiments of the present disclosure, the following beneficial effects may be achieved. For each to-be-merged collection, by determining turnover containers storing items corresponding to the to-be-merged collection, a correspondence between the to-be-merged collection and the turnover containers is established, and the container supply line is controlled to provide the determined turnover containers. The container supply line may transport each turnover container from a sorting position to a pickup position, so that the transporting device can obtain the turnover container at the pickup position, and transport the turnover container to the temporary storage position in the temporary storage region. When the turnover containers are all transported to the temporary storage rack, the turnover containers corresponding to the to-be-merged collection are transported to the merging processing station, and merging is performed for the to-be-merged collection. Compared with the existing roller line merging system, by replacing the branch line temporary storage turnover container of the roller line with the temporary storage rack, the limitation of the number and length of the branch line on the number of the to-be-merged collections and the number of turnover containers can be avoided. In addition, the transportation of the turnover containers is performed no longer depending on the roller line, but is performed by the transporting device, and there is no rigid connection between the temporary storage rack, the container supply line and the merging processing station in the present disclosure, devices (such as, a track, a roller line) is also unnecessary for connection, so that the number of temporary storage racks and merging processing stations in the system and positions thereof may be flexibly changed according to actual needs. Therefore, the flexibility and expansibility of the system are increased when performing merging for a to-be-merged collection, and the processing efficiency is improved.

BRIEF DESCRIPTION OF THE DRAWINGS

Other features, objects and advantages of the present disclosure will become more apparent when reading the detailed description of non-limiting embodiments given with reference to the drawings. The drawings are for the purpose of illustrating preferred embodiments only and are not to be considered as limiting of the present disclosure. Also, the same components are denoted by the same reference numerals throughout the drawings. In the drawings.

DETAILED DESCRIPTION OF EMBODIMENTS

In order to make the purpose, technical solutions and advantages of the present disclosure clearer, technical solutions of the present disclosure will be clearly and completely described below in specific embodiments of the present disclosure with reference to the drawings. Apparently, the described embodiments are only some, rather than all, of the embodiments of the present disclosure. Based on the embodiments in the present disclosure, all other embodiments obtained by those skilled in the art without creative efforts should fall within the protection scope of the present disclosure.

The technical solutions according to the embodiments of the present disclosure will be described in detail below with reference to the drawings.

Figure 1:
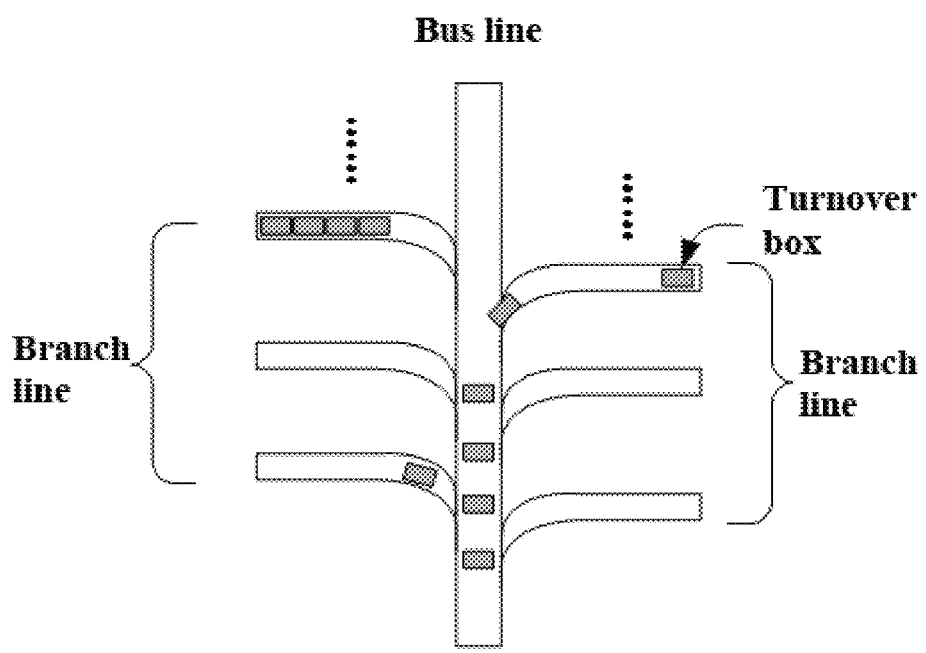
FIG. 1 is a schematic diagram of a roller line merging system.
Figure 2:
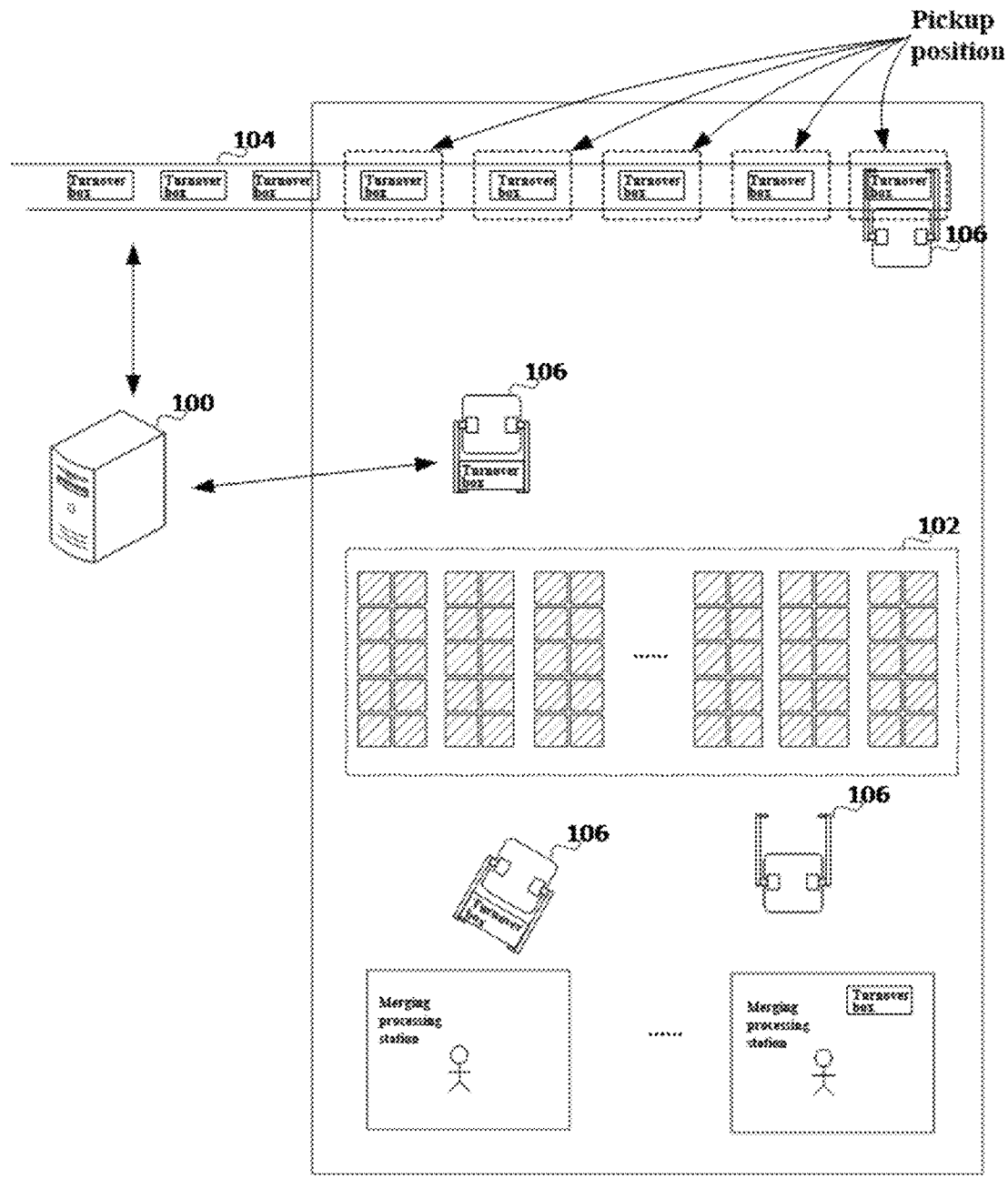
FIG. 2 is a schematic diagram of a merging processing system according to an embodiment of the present disclosure.

FIG. 2 is a schematic diagram of a merging processing system according to an embodiment of the present disclosure. The system includes a control center 100, a temporary storage rack 102 placed in a temporary storage region, a container supply line 104, and a transporting device 106.

The control center 100 is configured to remotely control the container supply line 104 and the transporting device 106 to perform merging processing for a to-be-merged collection. The container supply line connects different warehouse partitions and a region for merging processing for the to-be-merged collection. Several pickup positions are arranged at the region for merging processing for the to-be-merged collection. The transporting device 106 may move in the region, and may transport a turnover container provided by the supply line 104 at the pickup position to the temporary storage rack 102 arranged in the region. The temporary storage rack 102 is configured to temporarily store turnover containers corresponding to the to-be-merged collection. When determining that turnover containers corresponding to a to-be-merged collection are transported to the temporary storage rack 102 in the temporary storage region, the control center 100 controls the transporting devices 106 to transfer the turnover containers corresponding to the to-be-merged collection to the merging processing station in the region for merging. The number of merging processing stations in the region may be set as required. Since the turnover container may be transported to the merging processing station by the transporting device 106, the merging processing stations are arranged in island-type, that is, it is unnecessary to connect the merging processing station with other device (such as roller lines, container supply lines and the like).

Specifically, the control center 100 may determine a to-be-merged collection for merging processing, and determine, according to items corresponding to the to-be-merged collection, which warehouse partitions store the items corresponding to the to-be-merged collection, and determine items each partition needs to provide, and determine turnover s storing the determined items. For example, if items corresponding to a to-be-merged collection A include: a, b, and c, which are stored at warehouse racks of partition 1, partition 2, and partition 3, respectively, the merging processing system of the to-be-merged collection requires three turnover containers, to store items a, b, and c respectively in partition 1, partition 2, and partition 3. The control center 100 may send control instructions to the container supply line 104 connected to the partition 1, the partition 2, and the partition 3, to control the container supply line 104 to provide turnover containers, so that the container supply line 104 connected to the partition 1 provides a turnover container storing the item a, the container supply line 104 connected to the partition 2 provides the turnover container storing the item b, and the container supply line 104 connected to the partition 3 provides the turnover container storing the item c.

At present, steps of determining items corresponding to the to-be-merged collection, and determining turnover containers corresponding to the to-be-merged collection according to storage positions of the determined items are necessary for merging processing for the to-be-merged collection, which is relatively mature in the conventional art. Since the specific implementation of this part is not limited in the present disclosure, details are not repeated herein, and reference may be made to the method adopted in the conventional art (for example, a process of a roller line merging system controlling a roller line in each partition to transport a turnover container to a bus line).

In the present disclosure, after determining the turnover containers storing the items corresponding to the to-be-merged collection, the control center 100 may establish a correspondence between the determined turnover containers and the to-be-merged collection, so that a position of each turnover container the progress of the merging processing can be determined subsequently. In an embodiment, identifiers may be set for the turnover container and the to-be-merged collection, and a correspondence between the turnover container and the to-be-merged collection may be established by using the identifiers, which is not limited in the present disclosure.

As mentioned above, the control center 100 determines the turnover containers corresponding to the to-be-merged collection, so as to control the container supply line 104 to provide the determined turnover containers, so as to perform a merging process on the items corresponding to the to-be-merged collection. Therefore, the control center 100 may also control the container supply line 104 to provide the turnover containers.

Under the control of the control center 100, the container supply line 104 may transport the turnover container from each partition to a pickup position where the transporting device 106 obtains the turnover container.

The transporting device 106 transports the turnover container provided by the container supply line 104 at the pickup position to a cargo position of the temporary storage rack 102 preset by the control center for the turnover container.

In other embodiments of the present disclosure, if the control center does not set the storage position of the turnover container in advance, the transporting device 106 may also transport the turnover container from the pickup position to an idle position of the temporary storage rack 102, and transfer a position identifier of the position to the control center 100.

Figure 3:
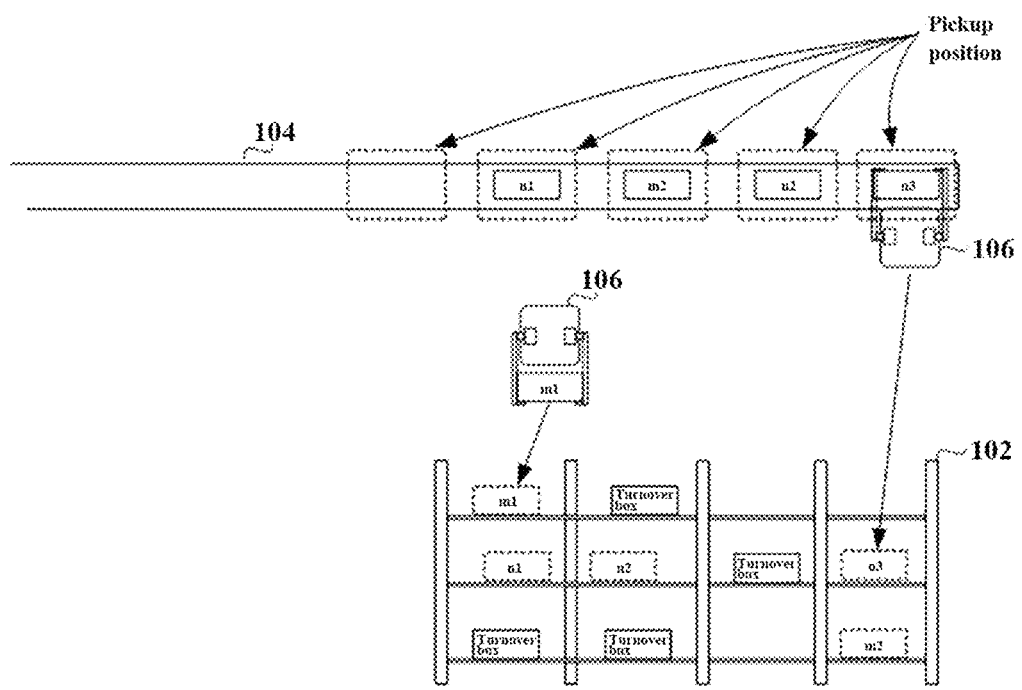
FIG. 3 is a schematic diagram of a scenario that a container supply line provides turnover containers and a transporting device transports a turnover container to a temporary storage rack according to an embodiment of the present disclosure.

FIG. 3 is a schematic diagram of a scenario that a container supply line provides turnover containers and a transporting device transports a turnover container to a temporary storage rack according to an embodiment of the present disclosure. In FIG. 3, the container supply line 104 transports turnover containers corresponding to two to-be-merged collections to respective pickup positions, that is, turnover containers m1 and m2 corresponding to a to-be-merged collection M and turnover containers n1 to n3 corresponding to a to-be-merged collection N are transported to the pickup positions through the container supply line 104. Under the control of the control center 100, the transporting devices 106 in the idle state wait to transport the turnover containers at respective pickup positions. For each transporting device 106 waiting to transport the turnover container at the pickup position, when the turnover container arrives at the pickup position where the transporting device 106 is located, the transporting device 106 may transport the turnover container to the idle cargo position of the temporary storage rack 102, where the dashed box in the temporary storage rack 102 indicates an idle cargo position where the turnover container may be placed, and the transporting device 106 may transport the turnover container m1 to the idle cargo position corresponding to the dashed box marked with m1, and so on.

In addition, the transporting device 106 may be provided with a robotic arm, and the robotic arm may grab the turnover container from the pickup position of the container supply line 104, and place the turnover container on the free cargo position of the temporary storage rack through the robotic arm. The transporting device 106 includes an action mechanism and a robotic arm that may lift and grab cargos. The present disclosure does not limit how the transporting device 106 obtains and transports the turnover container.

Figure 4:
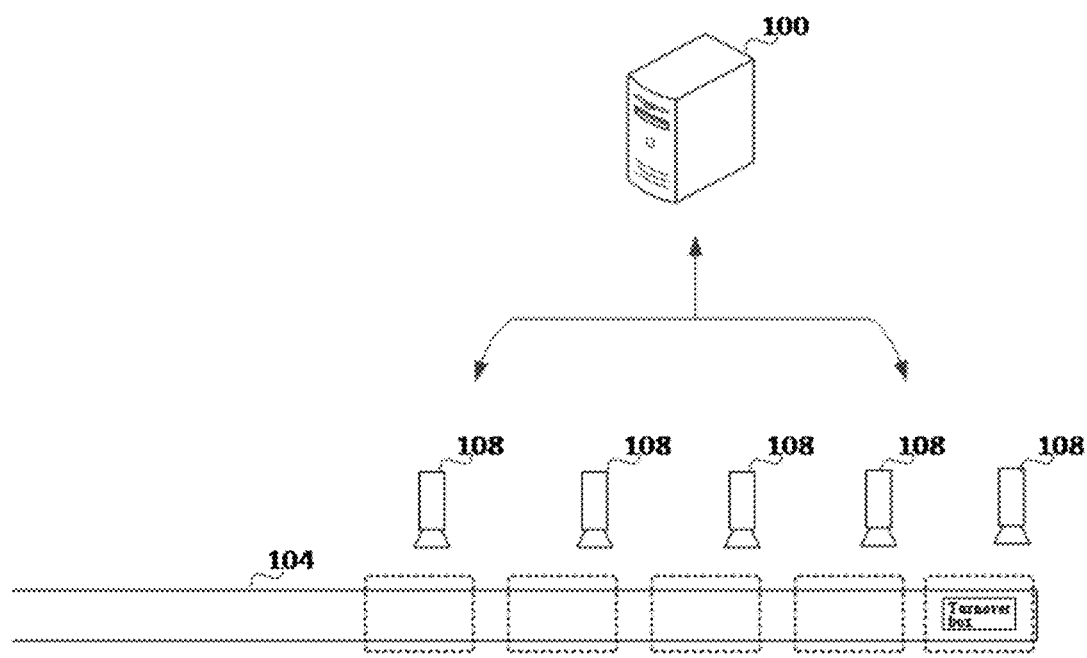
FIG. 4 is a schematic diagram of identifier identifying devices on a container supply line according to an embodiment of the present disclosure.

Further, in the present disclosure, the system may further include an identifier identifying device 108 for identifying a container identifier of a turnover container provided by the container supply line 104 to the pickup position, and sending the container identifier to the control center 100, as shown in FIG. 4. The identifier identifying device 108 may specifically be a camera, a scanning gun or the like, and is used for obtaining and identifying the container identifier of the turnover container arriving at the pickup position. Specifically, the container identifier may be a digital object unique identifier (DOI), such as a two-dimensional code, a barcode, and the like. The DOI carries the container identifier of the turnover container, and the identifier identifying device 108 may obtain the container identifier of the turnover container by collecting the DOI. For example, the camera collects the two-dimensional code carrying the container identifier of the turnover container, and determines the container identifier of the turnover container.

FIG. 4 is a schematic diagram of identifier identifying devices on a container supply line according to the present disclosure. Each pickup position of the container supply line is provided with an identifier identifying device 108, so that when the turnover container provided by the container supply line 104 reaches the pickup position, the identifier identifying device 108 may collect the DOI of the turnover container, determine the container identifier of the turnover container, and send the container identifier to the control center 100.

If the number of to-be-merged collections to be processed is small, the control center 100 may, after receiving the container identifier, select several transporting devices 106 from transporting devices 106 in the idle state according to a state of each transporting device 106, and send a control instruction to each selected transporting device 106 to move the selected transporting device 106 to the pickup position of the container supply line 104 to obtain the turnover containers and transport the turnover containers to the cargo position of the temporary storage rack 102. The storage position of the temporary storage rack 102 is determined from temporary storage positions at the temporary storage region that are in the idle state. After determining the cargo position of the turnover container in the temporary storage rack 102, the state of the determined cargo position is updated to be an occupied state, and the correspondence between the container identifier of the turnover container and the cargo position 102 is stored, and a control instruction is sent to the transporting device 106, so that the transporting device 106 transports the turnover container to the determined cargo position.

The transporting device 106 obtains the turnover container at the pickup position of the container supply line 104 according to the control instruction of the control center 100 and transports the turnover container to the temporary storage position, such as the cargo position.

In other embodiments of the present disclosure, the transporting device 106 may also transport the turnover container to the cargo position, and collect a cargo position identifier of the cargo position and send the cargo position identifier to the control center 100.

The control center 100 may determine, according to the cargo position identifier sent by the transporting device 106, at which cargo position of the temporary storage rack 102 the turnover container to be transported is stored. Specifically, the control center 100 may determine a correspondence between the container identifier of the turnover container and the cargo position identifier according to the cargo position identifier sent by the transporting device 106, and store the correspondence.

Figure 5:
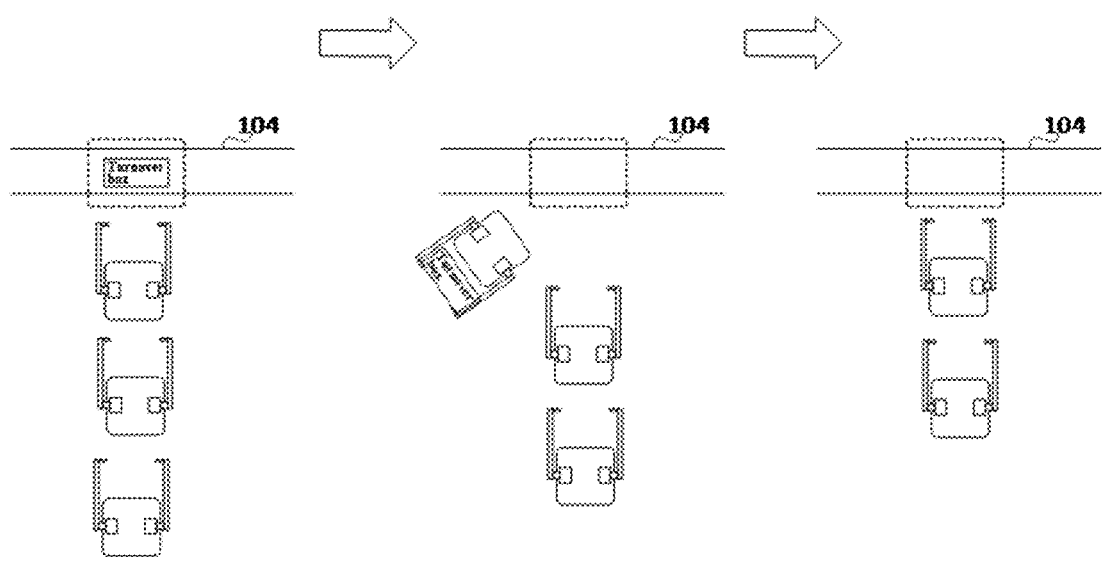
FIG. 5 is a schematic diagram of a scenario that transporting devices queue up at a pickup position for transporting turnover containers according to an embodiment of the present disclosure.

If there are a large number of to-be-merged collections to be processed, the control center 100 may control, for each pickup position of the container supply line 104, multiple transporting devices 106 in an idle state to wait in line at the pickup position. When a turnover container reaches at the pickup position, the control center may receive the container identifier sent by the identifier identifying device 108, and send a control instruction to the transporting device 106 at the top of the queue. The transporting device 106 transports the turnover container to the temporary storage rack 102 in response to the control instruction, and the remaining transporting devices 106 in the queue fill positions in sequence to wait for other turnover containers to reach the pickup position, as shown in FIG. 5. FIG. 5 is a schematic diagram of a scenario that transporting devices queue up at a pickup position for transporting turnover containers according to an embodiment of the present disclosure. It may be seen that there are three transporting devices on the pickup position waiting to transport the turnover containers, and successively transport each turnover container to the temporary storage position.

In addition, in the present disclosure, the transporting device 106 may be provided with a collecting device for the cargo position identifier of the cargo position, such as a camera, a scanning gun, or an identifier identifying device 108 may be provided. When the transporting device 106 transports the turnover container to the cargo position of the temporary storage rack 102, the collecting device or the identifier identifying device 108 collects the cargo position identifier of the cargo position and sends the cargo position identifier to the control center 100.

In the present disclosure, the control center 100 may also determine, for each of the turnover containers provided by the container supply line 104, a cargo position for placing the turnover container from cargo positions in the idle state on the temporary storage rack 102, and update the state of the determined cargo position to be an occupied state. Then, the control center 100 send a control instruction to the transporting device 106, so that the transporting device 106 transports the turnover container to the determined cargo position.

Specifically, when receiving the container identifier sent by the identifier identifying device 108, the control center 100 determines an idle cargo position on the temporary storage rack 102, and update the state of the cargo position to be the occupied state. The control center 100 sends a control instruction to the transporting device 106 to transport the turnover container corresponding to the container identifier to the determined cargo position. The transporting device 106 transports the turnover container to the determined cargo position in response to the received control instruction. Since the control center 100 may already determine the cargo position of the turnover container before the transporting device 106 transports the turnover container to the cargo position of the temporary storage rack 120, the transporting device 106 does not need to collect the cargo position identifier of the cargo position.

Further, since the control center 100 has determined the container identifier of each turnover container corresponding to to-be-merged collection, and stored the correspondence between the container identifier and the cargo position identifier of each turnover container transported to the temporary storage rack 102, for each to-be-merged collection, the control center 100 may determine a progress of transporting the turnover containers corresponding to the to-be-merged collection to the temporary storage rack 102 according to the correspondence between the container identifier and the cargo position identifier. When the turnover containers corresponding to the to-be-merged collection are transported to the temporary storage rack 102, the control center 100 may determine an idle merging processing station from merging processing stations, and send a control instruction to the transporting device 106.

The transporting device 106 sequentially transports the turnover containers corresponding to the to-be-merged collection from the temporary storage rack 102 to the determined merging processing station in response to the received control instruction.

Specifically, the control center 100 may determine multiple transporting devices 106 in an idle state according to the number of turnover containers corresponding to the to-be-merged collection, and send control instructions to the determined transporting devices 106, so that each transporting device 106 may obtain a turnover container corresponding to the to-be-merged collection from the temporary storage rack 102 in response to the received control instruction, and transport the turnover container to the merging processing station.

In addition, since the merging processing capacity of the merging processing station has an upper limit, for example, the number of turnover containers that may be processed at the same time is limited, in order to prevent the number of turnover containers being transported from exceeding the upper limit of the capacity of the merging processing station, in the present disclosure, the control center 100 may sequentially send control instructions to the transporting devices 106, so that the transporting devices 106 may sequentially transport the turnover containers corresponding to the to-be-merged collection to the determined merging processing station, so that the number of turnover containers processed by the merging processing station needs at the same time can be controlled. The number of transporting devices 106 required to process a to-be-merged collection at the same time is reduced, the time during which the transporting device 106 is in an idle state is reduced, and processing efficiency is improved.

Figure 6:
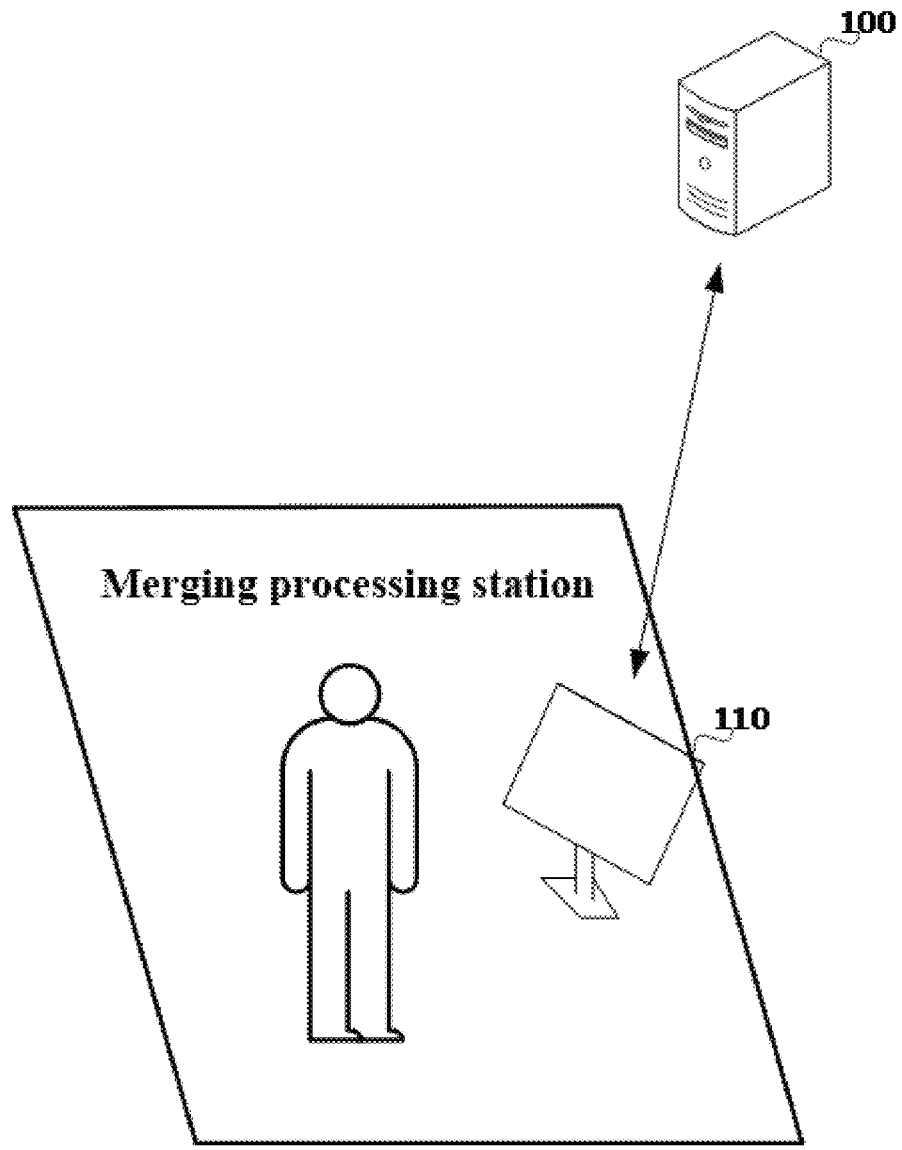
FIG. 6 is a schematic diagram of a terminal at a merging processing station according to an embodiment of the present disclosure.

In the merging processing system for a to-be-merged collection according to the present disclosure, the system may further include a terminal 110, the terminal 110 is arranged at the merging processing station and receives information sent by the control center 100, as shown in FIG. 6, which is a schematic diagram of a terminal at a merging processing station.

The control center 100 sends order information of the to-be-merged collection to a terminal 110 corresponding to the determined merging processing station, and updates the state of the merging processing station to be a busy state.

The terminal 110 displays the received order information of the to-be-merged collection, and sends notification information to the control center 100 when the items corresponding to the to-be-merged collection are merged.

The control center 100 updates the state of the merging processing station where the terminal 110 is located to be an idle state according to the received notification information.

The order information is used to notify a staff at the merging processing station where the terminal 110 is located what items are included in the to-be-merged collection, which orders are included in the to-be-merged collection, and which items correspond to each order in the to-be-merged collection. According to the order information, the staff may determine how to perform the merging processing on the to-be-merged collection. Specifically, the content of the order information may be set as required, which is not limited in this disclosure. For example, according to the outbound logic of the warehouse, assuming that the merging processing in the warehouse outbound logic is to select the items corresponding to the to-be-merged collection, the order information only needs to include the item information of the items corresponding to the to-be-merged collection, and the staff may determine, according to the order information, whether all items corresponding to the to-be-merged collection have been merged. If the merging processing in the outbound logic of the warehouse also includes preliminary sorting of each order in the to-be-merged collection, the order information may further include information required for preliminary sorting.

In addition, in the present disclosure, the system also includes a seeding rack 112, which is arranged at the merging processing station, and is used for placing the items corresponding to the to-be-merged collection. That is, the merging processing station may transfer the items in the turnover container carried by the transporting device 106 to the seeding rack 112, and when the items corresponding to the to-be-merged collection are transferred to the seeding rack 112, it is determined that merging processing for the to-be-merged collection is completed.

For each terminal 110 in the system, the terminal 110 may obtain item information of items transferred from the turnover container to the seeding rack 112, and upload the item information to the control center 100. Therefore, the control center 100 may determine the progress of each merging processing station in processing the to-be-merged collection according to the received item information.

Further, since the control center 100 may determine the progress of each merging processing station in processing the to-be-merged collection according to the received item information, the control center 100 may also estimate, for each terminal 110 according to the item information of the items in the turnover container being processed at the merging processing station where the terminal 110 is located and the item information uploaded by the terminal, a completion time for the turnover container.

For example, assuming that the number of items in the turnover container transported by the transporting device 106 is ten, after the transporting device 106 transports the turnover container to the merging processing station, the terminal 110 at the merging processing station uploads item information of five items within one minute, the control center 100 may estimate the completion time of the merging processing station processing the turnover container. Alternatively, the control center 100 may also determine the completion time of the turnover container by performing prediction through a prediction model. For example, the frequency of uploading the item information by the terminal 110 and the number of items corresponding to the turnover container are inputted into the pre-trained prediction model, and the completion time outputted by the prediction model is obtained. The training samples used to train the prediction model may be determined according to the historical data of the to-be-merged collections at each merging processing station, and a loss of the prediction model may be determined according to a difference between an actual processing time of a turnover container and the completion time outputted by the prediction model, and the parameters of the prediction model may be adjusted according to the determined loss.

After estimating the completion time of the turnover container currently processed by the merging processing station, the control center 100 may send a control instruction to the transporting device 106 according to the estimated completion time of the turnover container.

According to the received control instruction, the transporting device 106 transports another container to the merging processing station after the container at the merging processing station is processed.

For example, assuming that a to-be-merged collection that a merging processing station needs to process corresponds to three turnover container containers, and the merging processing station may only process one container at the same time, after the transporting device transports a first container to the merging processing station, the control center estimates that the turnover container will be processed for five minutes according to the received item information and the number of items contained in the turnover container. The time required for the second turnover container to be transported from the temporary storage rack to the merging processing station is one minute, the control center may send a control instruction to another transporting device after four minutes, so that the other transporting device may transport a second transported turnover after the merging processing station process the first turnover container, and so on until the merging for the to-be-merged collection is completed.

Further, in the present disclosure, the seeding rack 112 may be movable, and the control center 100 determines, for each terminal 110, the transporting device 106 in an idle state when sending the order information to the terminal 110, and sends a control instruction to the transporting device 106.

The transporting device 106 transports the seeding rack 112 in an idle state to the merging processing station where the terminal 110 is located.

In a case that the seeding rack 112 may be flexibly moved, the correspondence between the seeding rack 112 and the merging processing station is weakened, and the positions of the merging processing stations in the merging processing region may be flexibly arranged as required, so that the flexibility of the merging processing system is further increased.

In the present disclosure, the system may further include: a replacement rack 114, the replacement rack 114 is arranged at the merging processing station and is used for placing the turnover container transported by the transporting device 106.

The transporting device 106 may directly place the turnover container on the replacement rack 114 when transporting the turnover container to the merging processing station without waiting at the merging processing station for the staff to transfer the items in the turnover container to the seeding rack 112, to perform other tasks. The transportation capacity of the transporting device 106 may be greatly liberated, and the problem of wasting transporting capacity of the transporting device 106 caused by waiting may be reduced. The replacement rack 114 has at least two cargo positions. After the transporting device 106 transports the turnover container to the replacement rack 114, the staff at the merging processing station transfers the items. When the items in the turnover container are all transferred to the seeding rack 112, the turnover container is empty. Then, the transporting device 106 transports another turnover container to the replacement rack 114 at another empty cargo position, and transport the empty turnover container after the merging processing on the replacement rack to a designated position, which may be a position where empty turnover containers are collected.

By arranging the replacement rack 114, the waiting time of the transporting device 106 at the merging processing station may be reduced, and the usage efficiency of the transporting device 106 may be improved.

Based on the system shown in FIG. 2, for each to-be-merged collection, by determining turnover containers storing items corresponding to the to-be-merged collection, a correspondence between the to-be-merged collection and the turnover containers is established, and the container supply line is controlled to provide the determined turnover containers. The container supply line may transport each turnover container from a sorting position to a pickup position, so that the transporting device can obtain the turnover container at the pickup position, and transport the turnover container to the temporary storage position in the temporary storage region. When the turnover containers are all transported to the temporary storage rack, the turnover containers corresponding to the to-be-merged collection are transported to the merging processing station, and merging is performed for the to-be-merged collection. Compared with the existing roller line merging system, by replacing the branch line temporary storage turnover container of the roller line with the temporary storage rack, the limitation of the number and length of the branch line on the number of the to-be-merged collections and the number of turnover containers can be avoided. In addition, the transportation of the turnover containers is performed no longer depending on the roller line, but is performed by the transporting device, and there is no rigid connection between the temporary storage rack, the container supply line and the merging processing station in the present disclosure, devices (such as, a track, a roller line) is also unnecessary for connection, so that the number of temporary storage racks and merging processing stations in the system and positions thereof may be flexibly changed according to actual needs. Therefore, the flexibility and expansibility of the system are increased when performing merging for a to-be-merged collection, and the processing efficiency is improved.

In an embodiment of the present disclosure, the to-be-merged collection may be a collection order. Based on the system shown in FIG. 2, for each collection order, by determining turnover containers storing items corresponding to the collection order, a correspondence between the collection order and the turnover containers is established, and control each container supply line is controlled to provide the determined turnover containers. The container supply line may transport each turnover container from a sorting position to a pickup position, and sorting positions may be located in the same inventory partition or different inventory partitions. The transporting device may obtain the turnover container at the pickup position and transport the turnover container to a designated cargo position in the temporary storage region. When it is determined that the turnover containers corresponding to the collection order are all transported to the temporary storage rack in the temporary storage region, the turnover containers corresponding to the collection order are transported to the merging processing station, and merging is performed for the collection order. In the present disclosure, there is no rigid connection between the temporary storage racks, the container supply line and the merging processing station, devices (such as, a track, a roller line) are also unnecessary for connection, so that the number of temporary storage racks and merging processing stations in the system and positions thereof may be flexibly changed according to actual needs. Therefore, the flexibility and expansibility of the system are increased when performing merging for a collection order, and the processing efficiency is improved.

In another embodiment of the present disclosure, the to-be-merged collection may be a Stock Keeping Unit (SKU) collection of the same store. Based on the system shown in FIG. 2, for each SKU collection, by determining turnover containers storing items corresponding to the SKU collection, a correspondence between the SKU collection and the turnover containers is established, and control each container supply line is controlled to provide the determined turnover containers. The container supply line may transport each turnover container from a sorting position to a pickup position, and sorting positions may be located in the same inventory partition or different inventory partitions. The transporting device may obtain the turnover container at the pickup position and transport the turnover container to a designated cargo position in the temporary storage region.

When it is determined that the turnover containers corresponding to the SKU collection are all transported to the temporary storage rack in the temporary storage region, the turnover containers corresponding to the SKU collection are transported to the merging processing station, and the merging is performed for the SKU collection. In the present disclosure, there is no rigid connection between the temporary storage racks, the container supply line and the merging processing station, devices (such as, a track, a roller line) are also unnecessary for connection, so that the number of temporary storage racks and merging processing stations in the system and positions thereof may be flexibly changed according to actual needs. Therefore, the flexibility and expansibility of the system are increased when performing merging for a SKU collection, and the processing efficiency is improved.

In another embodiment of the present disclosure, the to-be-merged collection may be a SKU collection of the same order. Based on the system shown in FIG. 2, for each SKU collection of the same order, by determining turnover containers storing items corresponding to the SKU collection, a correspondence between the SKU collection and the turnover containers is established, and control each container supply line is controlled to provide the determined turnover containers. The container supply line may transport each turnover container from a sorting position to a pickup position, and sorting positions may be located in the same inventory partition or different inventory partitions. The transporting device may obtain the turnover container at the pickup position and transport the turnover container to a designated cargo position in the temporary storage region. When it is determined that the turnover containers corresponding to the SKU collection are all transported to the temporary storage rack in the temporary storage region, the turnover containers corresponding to the SKU collection are transported to the merging processing station, and merging is performed for the SKU collection. In the present disclosure, there is no rigid connection between the temporary storage racks, the container supply line and the merging processing station, devices (such as, a track, a roller line) are also unnecessary for connection, so that the number of temporary storage racks and merging processing stations in the system and positions thereof may be flexibly changed according to actual needs. Therefore, the flexibility and expansibility of the system are increased when performing merging for each SKU collection of the same order, and the processing efficiency is improved.

In addition, there is no restriction on how to determine a moving route of the transporting device 106 in the present disclosure, and the control center 100 may determine the moving route by performing path planning for the transporting device 106 according to a movable region (that is, a region where both the temporary storage rack 102 and the merging processing station is not placed) in the merging processing region, the position of the transporting device 106 and the destination position (for example, the idle cargo position on the temporary storage rack 102, the merging processing station, the pickup position of the container supply line 104). Alternatively, the control center 100 may also determine the moving route of the transporting device according to a preset positioning mark on the ground. The transporting device 106 may identify the positioning mark (for example, two-dimensional code) laid on the ground based on visual mark navigation through a navigation identifying component carried by itself.

Alternatively, in the present disclosure, the transporting device 106 may also determine that it is in an idle state when it has not received the control instruction sent by the control center 100 for a period of time, and move to the pickup position of the container supply line 104 by itself, waiting for transporting the turnover container.

For each transporting device 106, after the transporting device 106 obtains the turnover container from the pickup position of the container supply line 104, the transporting device 106 may send notification information to the control center 100, and the control center 100 may determine, according to the notification information and the pickup position corresponding to the queue arranged by the transporting device 106, the container identifier of the turnover container transported by the transporting device 106.

Figure 7:
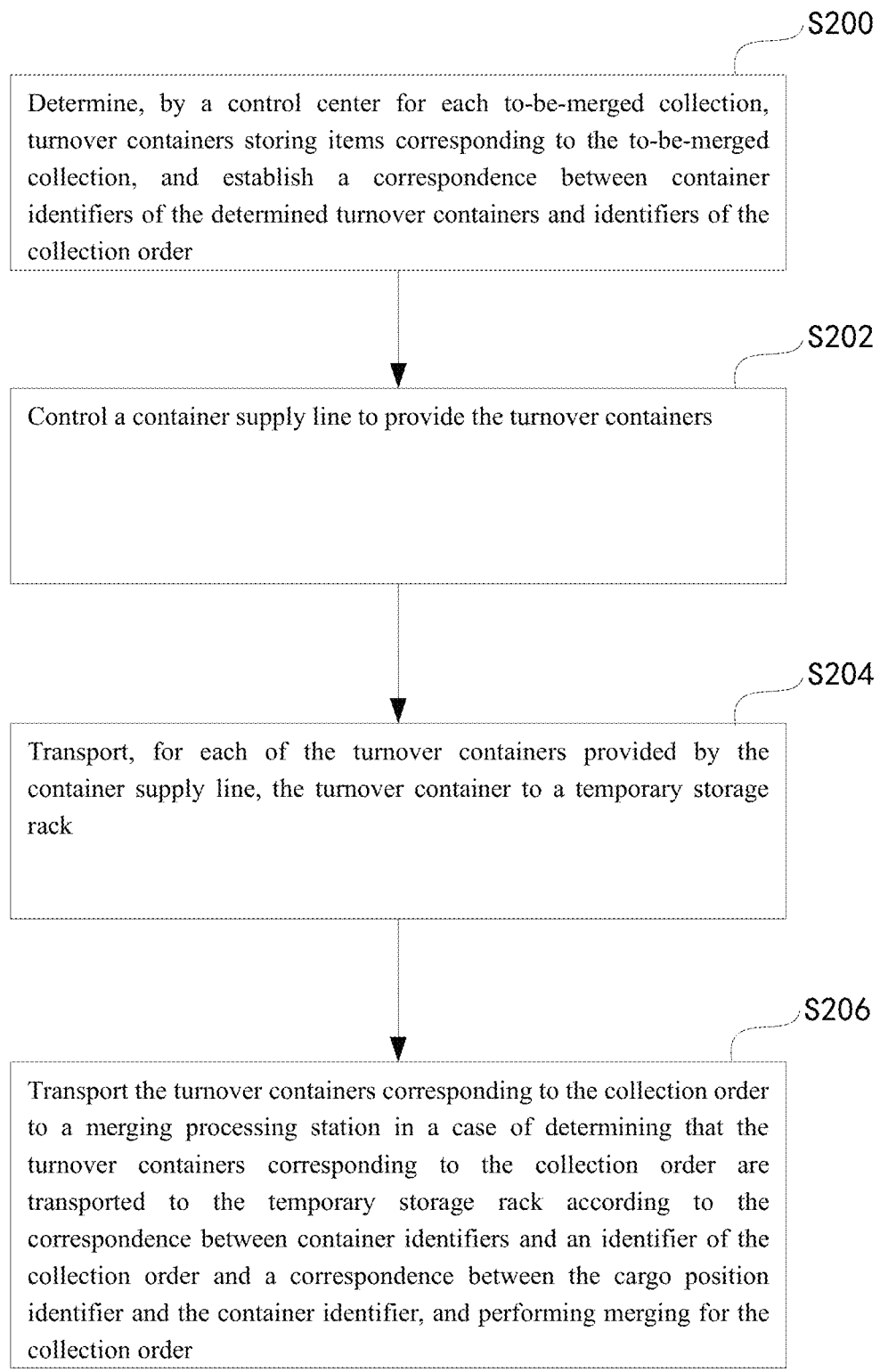
FIG. 7 is a schematic flowchart of a merging processing process according to an embodiment of the present disclosure.

Based on the system shown in FIG. 2, a merging processing method for a to-be-merged collection is further provided according to the present disclosure, as shown in FIG. 7.

FIG. 7 is a schematic diagram of a merging processing process for a to-be-merged collection according to the present disclosure. A warehouse includes a temporary storage rack, a container supply line and a transporting device. The merging processing process for a to-be-merged collection may include the following steps S200 to S206.

In step S200, the control center determines, for each to-be-merged collection, turnover containers storing items corresponding to the to-be-merged collection, and establishes a correspondence between the determined turnover containers and the to-be-merged collection.

In an embodiment, identifiers may be set for the turnover containers and the to-be-merged collection, and the correspondence between the turnover containers and the to-be-merged collection is established by using the identifiers, which is not limited in the present disclosure.

In the present disclosure, the control center may determine the to-be-merged collection for merging processing, and determine, according to the items corresponding to the to-be-merged collection, which sorting positions of a warehouse store the items corresponding to the to-be-merged collection, and determine which sorting positions need to provide the items and the turnover containers storing the determined items, and establish a correspondence between the container identifier of the determined turnover container and the identifier of the to-be-merged collection.

In step S202, the container supply line is controlled to provide the turnover containers.

In the present disclosure, after the turnover containers corresponding to the to-be-merged collection are determined, the container supply line may be controlled to provide the turnover containers so as to perform the merging processing.

In addition, the control center may collect the container identifier of the turnover container for each turnover container provided by the container supply line, and collect the cargo identifier of the cargo position after the turnover container is transported to the cargo position of the temporary storage rack. Then, the control center determines a correspondence between the container identifier of the turnover container and the cargo position identifier, and stores the correspondence.

In step S204, for each turnover container provided by the container supply line, the turnover container is transported to the temporary storage region.

In an embodiment, a temporary storage rack may be set in the temporary storage region, and multiple temporary storage positions may be set on the temporary storage rack. A unique identifier may be set for each temporary storage position.

The temporary storage position of the turnover container may be specified from temporary storage positions in the idle state in the temporary storage region. After specifying the temporary storage position of the turnover container, the state of the specified temporary storage position is updated to be an occupied state, the correspondence between the container identifier of the turnover container and the temporary storage position is stored, and a control instruction is sent to the transporting device to instruct the transporting device to transport the turnover container to the designated cargo position.

According to the control instruction of the control center, the transporting device obtains the turnover container at the pickup position of the container supply line and transports the turnover container to the designated cargo position.

In other embodiments of the present disclosure, the transporting device may also transport the turnover container to the temporary storage position by itself, collect the identifier information of the temporary storage position, such as the cargo position identifier, and send the identifier information to the control center.

The correspondence between the turnover container and the temporary storage cargo position is established through the container identifier of the turnover container and the storage position identifier. The present disclosure does not limit the process for establishing the correspondence.

In the present disclosure, the control center determines the cargo position where the turnover container is placed from the empty cargo positions on the temporary storage rack, updates the state of the determined cargo position to be the occupied state, and controls the transporting device to transport the turnover container to the cargo position.

In step S206, when it is determined that the turnover containers corresponding to the to-be-merged collection are transported to the temporary storage rack according to the correspondence between the turnover containers and the to-be-merged collection and the correspondence between the temporary storage position and the turnover container, the turnover containers corresponding to the to-be-merged collection are transported to the merging processing station, and merging is performed for the to-be-merged collection.

In the present disclosure, when determining that the turnover container corresponding to the to-be-merged collection are transported to the temporary storage rack, the control center may determine a merging processing station in an idle state from merging processing stations, and control the transporting device to transport the turnover containers corresponding to the to-be-merged collection successively from the temporary storage rack to the determined merging processing station.

In addition, the control center may send the order information of the to-be-merged collection to a terminal corresponding to the determined merging processing station, and update the state of the merging processing station to be a busy state, receive notification information sent by the terminal after the items corresponding to the to-be-merged collection are merged, and update the state of the merging processing station where the terminal is located to be the idle state according to the received notification information.

In addition, when the merging processing station is performing merging processing, the control center may receive the item information uploaded by the terminal at the merging processing station, and the item information is the item information obtained by the terminal and regarding the items transferred from the turnover container to the seeding rack.

The control center may estimate the completion time of the turnover container according to the item information uploaded by the terminal and the item information of the items in the turnover container being processed in the merging processing station where the terminal is located, and control, according to the determined completion time and after the turnover container is processed, the transporting device to transport another turnover container to the merging processing station.

For the detailed execution process of the method, reference may be made to the above-mentioned merging processing system for a to-be-merged collection, and the process of performing the merging processing for the to-be-merged collection will not be repeated in the present disclosure.

Based on the method shown in FIG. 7, for each to-be-merged collection, by determining turnover containers storing items corresponding to the to-be-merged collection, a correspondence between the to-be-merged collection and the turnover containers is established, and the container supply line is controlled to provide the determined turnover containers. The container supply line may transport each turnover container from a sorting position to a pickup position, so that the transporting device can obtain the turnover container at the pickup position, and transport the turnover container to the temporary storage position in the temporary storage region. When the turnover containers are all transported to the temporary storage rack, the turnover containers corresponding to the to-be-merged collection are transported to the merging processing station, and merging is performed for the to-be-merged collection. Compared with the existing roller line merging system, by replacing the branch line temporary storage turnover container of the roller line with the temporary storage rack, the limitation of the number and length of the branch line on the number of the to-be-merged collection and the number of turnover containers can be avoided. In addition, the transportation of the turnover container is performed no longer depending on the roller line, but is performed by the transporting device, and there is no rigid connection between the temporary storage rack, the container supply line and the merging processing station in the present disclosure, devices (such as, a track, a roller line) are also unnecessary for connection, so that the number of temporary storage racks and merging processing stations in the system and positions thereof may be flexibly changed according to actual needs. Therefore, the flexibility and expansibility of the system are increased when performing merging for a to-be-merged collection, and the processing efficiency is improved.

In an embodiment of the present disclosure, the to-be-merged collection may be a collection order. Based on the method shown in FIG. 7, for each collection order, by determining turnover containers storing items corresponding to the collection order, a correspondence between the collection order and the turnover containers is established, and control each container supply line is controlled to provide the determined turnover containers. The container supply line may transport each turnover container from a sorting position to a pickup position, and sorting positions may be located in the same inventory partition or different inventory partitions. The transporting device may obtain the turnover container at the pickup position and transport the turnover container to a designated cargo position in the temporary storage region. When it is determined that the turnover containers corresponding to the collection order are all transported to the temporary storage rack in the temporary storage region, the turnover containers corresponding to the collection order are transported to the merging processing station, and merging is performed for the collection order. In the present disclosure, there is no rigid connection between the temporary storage racks, the container supply line and the merging processing station, devices (such as, a track, a roller line) are also unnecessary for connection, so that the number of temporary storage racks and merging processing stations in the system and positions thereof may be flexibly changed according to actual needs. Therefore, the flexibility and expansibility of the system are increased when performing merging for a collection order, and the processing efficiency is improved.

In another embodiment of the present disclosure, the to-be-merged collection may be a Stock Keeping Unit (SKU) collection of the same store, and based on the method shown in FIG. 7, for each SKU collection, by determining turnover containers storing items corresponding to the SKU collection, a correspondence between the SKU collection and the turnover containers is established, and control each container supply line is controlled to provide the determined turnover containers. The container supply line may transport each turnover container from a sorting position to a pickup position, and sorting positions may be located in the same inventory partition or different inventory partitions. The transporting device may obtain the turnover container at the pickup position and transport the turnover container to a designated cargo position in the temporary storage region. When it is determined that the turnover containers corresponding to the SKU collection are all transported to the temporary storage rack in the temporary storage region, the turnover containers corresponding to the SKU collection are transported to the merging processing station, and the merging is performed for the SKU collection. In the present disclosure, there is no rigid connection between the temporary storage racks, the container supply line and the merging processing station, devices (such as, a track, a roller line) are also unnecessary for connection, so that the number of temporary storage racks and merging processing stations in the system and positions thereof may be flexibly changed according to actual needs. Therefore, the flexibility and expansibility of the system are increased when performing merging for a SKU collection, and the processing efficiency is improved.

In another embodiment of the present disclosure, the to-be-merged collection may be a SKU collection of the same order. Based on the method shown in FIG. 7, for each SKU collection of the same order, by determining turnover containers storing items corresponding to the SKU collection, a correspondence between the SKU collection and the turnover containers is established, and control each container supply line is controlled to provide the determined turnover containers. The container supply line may transport each turnover container from a sorting position to a pickup position, and sorting positions may be located in the same inventory partition or different inventory partitions. The transporting device may obtain the turnover container at the pickup position and transport the turnover container to a designated cargo position in the temporary storage region. When it is determined that the turnover containers corresponding to the SKU collection are all transported to the temporary storage rack in the temporary storage region, the turnover containers corresponding to the SKU collection are transported to the merging processing station, and the merging is performed for the SKU collection. In the present disclosure, there is no rigid connection between the temporary storage racks, the container supply line and the merging processing station, devices (such as, a track, a roller line) are also unnecessary for connection, so that the number of temporary storage racks and merging processing stations in the system and positions thereof may be flexibly changed according to actual needs. Therefore, the flexibility and expansibility of the system are increased when performing merging for each SKU collection of the same order, and the processing efficiency is improved.

Figure 8:
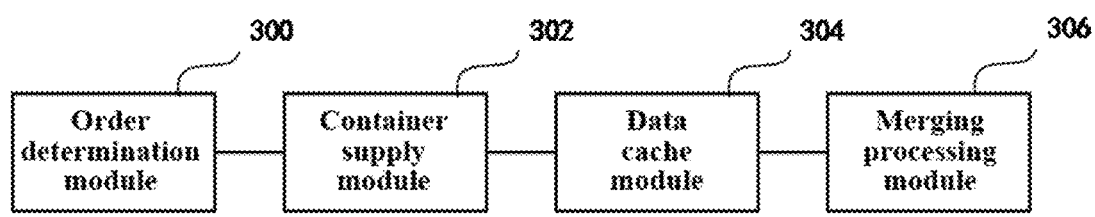
FIG. 8 is a schematic structural diagram of a merging processing device according to an embodiment of the present disclosure.

Based on the method shown in FIG. 7, a merging processing device for a to-be-merged collection is further provided according to the present disclosure, as shown in FIG. 8.

FIG. 8 is a schematic structural diagram of a merging processing device for a to-be-merged collection according to the present disclosure, and the device may include: an order determination module 300, a container supply module 302, a data cache module 304, and a merging processing module 306.

The order determination module 300 is configured to determine, by a control center for each to-be-merged collection, turnover containers storing items corresponding to the to-be-merged collection, and establish a correspondence between the determined turnover containers and the to-be-merged collection.

In an embodiment, identifiers may be set for the turnover containers and the to-be-merged collection, and the correspondence between the turnover containers and the to-be-merged collection is established by using the identifiers, which is not limited in the present disclosure.

The container supply module 302 is configured to control the container supply line to provide the turnover containers.

The data cache module 304 is configured to control, for each of the turnover containers provided by the container supply line, the transporting device to transport the turnover container to the temporary storage region, and determines a correspondence between the turnover container and the temporary storage position in the temporary storage region.

In an embodiment, a temporary storage rack may be set in the temporary storage region, and multiple temporary storage positions may be set on the temporary storage rack. A unique identifier may be set for each temporary storage position, and a correspondence between the turnover container and the temporary storage position may be established through the container identifier of the turnover container and the storage position identifier. The present disclosure does not limit the process for establishing the correspondence.

The merging processing module 306 is configured to control, when it is determined that the turnover container corresponding to the to-be-merged collection are transported to the temporary storage rack according to the correspondence between the turnover container and the to-be-merged collection and the correspondence between the temporary storage position and the turnover container, the transporting device to transport the turnover containers corresponding to the to-be-merged collection to the merging processing station, and perform merging for the to-be-merged collection.

In an embodiment of the present disclosure, the to-be-merged collection includes a collection order.

In another embodiment of the present disclosure, the to-be-merged collection includes a Stock Keeping Unit (SKU) collection of the same store, or a SKU collection of the same order.

In an embodiment, the turnover containers are from the same inventory partition or different inventory partitions.

In an embodiment, the data cache module 304 is configured to control, for each of the turnover containers provided by the container supply line an identifier identifying device to collect a container identifier of the turnover container, and control the transporting device to transport the turnover container to a designated cargo position on the temporary storage rack.

The cargo position of the turnover container may be specified from temporary storage positions in an idle state in the temporary storage region. After specifying the cargo position of the turnover container, the state of the designated cargo position is updated to ne an occupied state, a correspondence between the container identifier of the turnover container and the designated cargo position is stored, and a control instruction is sent to the transporting device to instruct the transporting device to transport the turnover container to the designated cargo position.

According to the control instruction of the control center, the transporting device obtains the turnover container at the pickup position of the container supply line and transports the turnover container to the designated cargo position.

In an embodiment, in other embodiments of the present disclosure, the data cache module 304 is configured to control the transporting device to collect identifier information of the temporary storage position after the transporting device transports the turnover container to the temporary storage position by itself, such as the cargo position identifier, determine a correspondence between the container identifier of the turnover container and the cargo position identifier, and store the correspondence.

In an embodiment, the data cache module 304 is further configured to determine the cargo position for placing the turnover container from cargo positions in the idle state on the temporary storage rack, update the state of the determined cargo position to be an occupied state, and transport the turnover container to the cargo position.

In an embodiment, the merging processing module 306 is configured to determine a merging processing station in an idle state from merging processing stations, and transport the turnover containers corresponding to the to-be-merged collection successively from the temporary storage rack to the determined merging processing station.

In an embodiment, the merging processing module 306 is further configured to send order information of the to-be-merged collection to a terminal corresponding to the determined merging processing station, and update the state of the merging processing station to be a busy state, receive notification information sent by the terminal after the items corresponding to the to-be-merged collection are merged, and update the state of the merging processing station where the terminal is located to be the idle state according to the received notification information.

In an embodiment, the merging processing module 306 is further configured to receive item information uploaded by the terminal, where the item information is the item information obtained by the terminal and regarding the items transferred from the turnover container to the seeding rack.

In an embodiment, the merging processing module 306 is further configured to estimate, for each terminal, the completion time of the turnover container according to the item information uploaded by the terminal and the item information of the items in the turnover container being processed in the merging processing station where the terminal is located, and control, according to the determined completion time and after the turnover container is processed, the transporting device to transport another turnover container to the merging processing station.

In an embodiment, the merging processing module 306 is further configured to transport, for each terminal, a seeding rack in an idle state to the merging processing station where the terminal is located when sending the order information to the terminal.

In an embodiment, the merging processing module 306 is further configured to transport, when there is an empty turnover container on a replacement rack of the merging processing station, the turnover containers corresponding to the to-be-merged collection to the replacement rack of the merging processing station, and transport the empty turnover container to a designated position.

A computer-readable storage medium is further provided according to an embodiment of the present disclosure, on which a computer program is stored, and when the program is executed by a processor, the aforementioned merging processing method is performed.

In addition to the software implementation, the present disclosure does not exclude other implementations, such as logic devices or the combination of software and hardware. That is, the execution subject of the following processing flow is not limited to logic units, but may also be hardware or logic device.

In the 1990s, an improvement in a technology could be clearly differentiated between improvements in hardware (for example, improvements in circuit structures such as diodes, transistors, switches) or improvements in software (improvements in method flow). However, with the development of technology, the improvement of many methods and processes today may be regarded as a direct improvement of the hardware circuit structure. Designers almost get the corresponding hardware circuit structure by programming the improved method flow into the hardware circuit. Therefore, it may not be considered that the improvement of a method flow may not be realized by hardware entity modules. For example, a Programmable Logic Device (PLD) such as a Field Programmable Gate Array (FPGA) is an integrated circuit which logical function is determined by programming the device by the user. The designer programs to "integrate" a digital system on a PLD without having to ask the chip manufacturer to design and manufacture a dedicated integrated circuit chip. Further, instead of making integrated circuit chips by hand, these days, most of this programming is done using "logic compiler" software, which is similar to the software compilers used in program development and writing. However, before compiling, the original codes also have to be written in a specific programming language, which is called Hardware Description Language (HDL), and there is not only one HDL, but many kinds, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), currently the most commonly used ones are Very-High-Speed Integrated Circuit Hardware Description Language (VHDL) and Verilog. It should also be clear to those skilled in the art that a hardware circuit for implementing the logic method process may be easily obtained by simply programming the method process in the above-mentioned several hardware description languages and programming it into the integrated circuit.

The controller may be implemented in any suitable manner, for example, the controller may take the form of a microprocessor or processor and a computer readable medium storing computer readable program code (for example, software or firmware) executable by the (micro) processor, logic gates, switches, application specific integrated circuits (ASICs), programmable logic controllers and embedded microcontrollers, examples of controllers include but are not limited to the following microcontrollers: ARC 625D, Atmel AT91SAM, Microchip PIC18F26K20 and Silicon Labs C8051F320, the memory controller may also be implemented as part of the control logic of the memory. Those skilled in the art also know that, in addition to implementing the controller in the form of pure computer-readable program code, the controller may be implemented as logic gates, switches, application-specific integrated circuits, programmable logic controllers and embedded devices by logically programming the method steps, to realize the same functions. Therefore, such a controller may be regarded as a hardware component, and the devices included therein for realizing various functions may also be regarded as a structure within the hardware component. Or even, the means for implementing various functions may be regarded as both a software module implementing a method and a structure within a hardware component.

The systems, devices, modules or units described in the above embodiments may be specifically implemented by computer chips or entities, or by products with certain functions. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination thereof.

For the convenience of description, the above device is described by various units which are divided according to the functions. However, in the present disclosure, the functions of each unit may be implemented in one or more software and/or hardware.

As will be appreciated by one skilled in the art, embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage medium (including, but not limited to, disk storage, CD-ROM, optical storage) having computer-usable program codes embodied therein.

The present disclosure is described with reference to flowcharts and/or block diagrams of methods, device (systems), and computer program products according to embodiments of the present disclosure. It will be understood that each flow and/or block in the flowcharts and/or block diagrams, and any combination of flows and/or blocks in the flowcharts and/or block diagrams, may be implemented by computer program instructions.

These computer program instructions may be provided to the processor of a general purpose computer, special purpose computer, embedded processor or other programmable data processing device to produce a machine such that the instructions executed by the processor of the computer or other programmable data processing device to produce a device for implementing the functions specified in one or more of the flowcharts and/or one or more blocks of the block diagrams.

These computer program instructions may also be stored in a computer-readable memory capable of directing a computer or other programmable data processing device to function in a particular manner, such that the instructions stored in the computer-readable memory generate an article including instruction means, the instruction means implements the functions specified in a flow or flows of the flowcharts and/or a block or blocks of the block diagrams.

These computer program instructions may also be loaded on a computer or other programmable data processing device to cause a series of operational steps to be performed on the computer or other programmable device to produce a computer-implemented process such that the instructions performed on the computer or other programmable device provide steps for implementing the functions specified in one or more of the flowcharts and/or one or more blocks of the block diagrams.

In a typical configuration, a computing device includes one or more processors (CPUs), input/output interfaces, network interfaces, and a memory.

The memory may include a non-persistent memory in computer readable medium, a random access memory (RAM) and/or a non-volatile memory in the form of, for example, a read only memory (ROM) or a flash memory (flash RAM). The memory is an example of a computer-readable medium.

The computer-readable medium includes both persistent and non-permanent, removable and non-removable medium, and storage of information may be implemented by any method or technology. Information may be computer readable instructions, data structures, modules of programs, or other data. Examples of the computer storage medium include, but are not limited to, phase-change memory (PRAM), static random access memory (SRAM), dynamic random access memory (DRAM), other types of random access memory (RAM), read only memory (ROM), Electrically Erasable Programmable Read Only Memory (EEPROM), Flash Memory or other memory technology, Compact Disc Read Only Memory (CD-ROM), Digital Versatile Disc (DVD) or other optical storage, Magnetic tape cassettes, magnetic tape magnetic disk storage or other magnetic storage devices or any other non-transmission medium that are used to store information that may be accessed by a computing device. As defined herein, the computer-readable medium does not include transitory computer-readable medium, such as modulated data signals and carrier waves.

It should also be noted that the terms "including", "comprising" or any other variation thereof are intended to encompass a non-exclusive inclusion such that a process, method, article or device including a series of elements includes not only include those elements, but also include other elements not expressly listed, or include elements which are inherent to such a process, method, article, or device. Without further limitation, an element qualified by the phrase "including a . . . " does not preclude the presence of additional identical elements in the process, method, article, or device that includes the element.

As will be appreciated by one skilled in the art, the embodiments of the present disclosure may be provided as a method, a system or a computer program product. Accordingly, this description may take the form of an entirely hardware embodiment, an entirely software embodiment, or an embodiment combining software and hardware aspects. Furthermore, the present disclosure may take the form of a computer program product embodied on one or more computer-usable storage medium (including, but not limited to, a disk storage, CD-ROM, an optical storage) having computer-usable program code embodied therein.

The present disclosure may be described in the general context of computer-executable instructions, such as program modules, being executed by a computer. Generally, program modules include routines, programs, objects, components, data structures, that perform particular tasks or implement particular abstract data types. The present disclosure may also be practiced in distributed computing environments where tasks are performed by remote processing devices that are linked through a communications network. In a distributed computing environment, program modules may be arranged in both local and remote computer storage medium including storage devices.

Embodiment of the present disclosure is described in a progressive manner, and the same and similar parts between the various embodiments may be referred to each other, and each embodiment focuses on the differences from other embodiments. In particular, as for the system embodiments, since they are basically similar to the method embodiments, the description is relatively simple, and for related parts, reference may be made to the descriptions of the method embodiments.

The above descriptions are merely examples of the present disclosure, and are not intended to limit the present disclosure. Various modifications and variations of the present disclosure are possible for those skilled in the art. Any modification, equivalent replacement, improvement made within the innovation and principle of the present disclosure shall be included within the scope of the claims of the present disclosure.

The invention claimed is:

1. A merging processing system, comprising: a control center, a temporary storage region, a container supply line, and a transporting device;
   wherein the control center is configured to:
      determine, for each of a plurality of to-be-merged collections, turnover containers storing items corresponding to the to-be-merged collection;
      establish a first correspondence between the turnover containers and the to-be-merged collection;
      control the container supply line to provide the turnover containers;
      determine a second correspondence between the turnover container transported by the transporting device and a temporary storage position in the temporary storage region; and
      in response to determining, according to the second correspondence, the turnover containers are transported to the temporary storage region, control the transporting device to transport the turnover containers to a merging processing station;
   wherein the container supply line is configured to transport each of the turnover containers from a corresponding sorting position to one of pickup positions where the transporting device obtains the turnover container;
   wherein the transporting device is configured to:
      transport the turnover container provided by the container supply line at a pickup position to the temporary storage region;
      successively transport, under control of the control center, the turnover containers corresponding to the to-be-merged collection to the merging processing station; and
      perform merging for the to-be-merged collection; and
   wherein the temporary storage region is configured to place the turnover container obtained by the transporting device from the container supply line.

2. The system according to claim 1, wherein the system further comprises a replacement rack, and the replacement rack is arranged at the merging processing station and is configured to place the turnover container transported by the transporting device;
   the transporting device is further configured to place, after transporting the turnover container to the merging processing station, the turnover container on the replacement rack, and transport an empty turnover container on the replacement rack for which merging is performed to a designated position.

3. The system according to claim 1, wherein the to-be-merged collection comprises a collection order, a Stock Keeping Unit (SKU) collection of a same store, or a SKU collection of a same order.

4. The system according to claim 1, wherein the pickup positions are located in a same inventory region or in different inventory regions; the temporary storage region comprises a temporary storage rack, and the temporary storage position comprises a cargo position on the temporary storage rack.

5. The system according to claim 1, wherein the system further comprises an identifier identifying device, and the identifier identifying device is configured to identify a container identifier of the turnover container provided by the container supply line at a pickup position, and send the container identifier to the control center.

6. The system according to claim 5, wherein:
   the control center is further configured to:
      determine, according to the received container identifier, a transporting device for transporting the turnover container from transporting devices that are in an idle state;
      determine a temporary storage position for placing the turnover container from temporary storage positions that are in an idle state;
      update a state of a determined cargo position to be an occupied state;
      store a correspondence between the container identifier of the turnover container and the temporary storage position; and
      send a control instruction to the transporting device to instruct the transporting device to transport the turnover container to the determined temporary storage position; and
   the transporting device is further configured to obtain, in response to the control instruction of the control center, the turnover container at the pickup position of the container supply line and transport the turnover container to the temporary storage position.

7. The system according to claim 1, wherein:
   the control center is further configured to:
      in response to determining, for each of the plurality of to-be-merged collections, according to a container identifier of each of the turnover containers corresponding to the to-be-merged collection and a stored second correspondence, that each of the turnover containers corresponding to the to-be-merged collection is placed in a corresponding temporary storage position, determine a merging processing station in an idle state from merging processing stations; and
      send a control instruction to the transporting device; and
   the transporting device is further configured to transport each of the turnover containers corresponding to the to-be-merged collection from the corresponding temporary storage position to the determined merging processing station in response to the received control instruction.

8. The system according to claim 7, wherein the system further comprises a terminal, and the terminal is arranged at the merging processing station and is configured to exchange information with the control center;

the control center is further configured to: send order information of the to-be-merged collection to the terminal corresponding to the determined merging processing station; update the state of the merging processing station to be a busy state; receive notification information indicating that merging is completed; and update the state of the merging processing station where the terminal is located to be an idle state, and the terminal is further configured to display the received order information of the to-be-merged collection, and send notification information to the control center in a case that the items corresponding to the to-be-merged collection are merged.

9. The system according to claim 8, wherein the system further comprises a seeding rack, and the seeding rack is arranged at the merging processing station and is configured to place the items corresponding to the to-be-merged collection.

10. The system according to claim 9, wherein the terminal is further configured to obtain item information of items transferred from a turnover container to the seeding rack, and upload the item information to the control center.

11. The system according to claim 9, wherein the control center is further configured to: estimate, for each of a plurality of terminals and according to item information of items in a turnover container being processed at the merging processing station where the terminal is located and item information uploaded by the terminal, a completion time for the turnover container; and control, according to the estimated completion time, the transporting device to transport another turnover container to the merging processing station after the turnover container is processed.

12. A merging processing method, comprising:
determining, by a control center for each of a plurality of to-be-merged collections, turnover containers storing items corresponding to the to-be-merged collection, and establishing a first correspondence between the determined turnover containers and the to-be-merged collection;
controlling a container supply line to provide the turnover containers;
controlling a transporting device to transport, for each of the turnover containers provided by the container supply line, the turnover container to a temporary storage region;
determining a second correspondence between the turnover containers transported by a transporting device and a temporary storage position in the temporary storage region;
in response to determining, according to the first correspondence and the second correspondence, that the turnover containers corresponding to the to-be-merged collection are transported to the temporary storage region, controlling the transporting device to transport the turnover containers to a merging processing station; and
performing merging for the to-be-merged collection.

13. The method according to claim 12, wherein the controlling the transporting device to transport each of the turnover containers corresponding to the to-be-merged collection to a merging processing station comprises:
controlling, in a case that there is an empty turnover container on a replacement rack of the merging processing station, the transporting device to transport the turnover containers corresponding to the to-be-merged collection to the replacement rack of the merging processing station, and transport the empty turnover container to a designated position.

14. The method according to claim 12, wherein the to-be-merged collection comprises a collection order, a Stock Keeping Unit (SKU) collection of a same store, or a SKU collection of a same order.

15. The method according to claim 12, wherein the controlling the transporting device to transport each of the turnover containers corresponding to the to-be-merged collection to a merging processing station comprises:
determining, by the control center, a merging processing station in an idle state from merging processing stations; and
controlling the transporting device to transport the turnover containers corresponding to the to-be-merged collection successively from a temporary storage rack to the determined merging processing station.

16. The method according to claim 15, further comprising:
sending, by the control center, order information of the to-be-merged collection to a terminal corresponding to the determined merging processing station, and updating the state of the merging processing station to be a busy state;
receiving, by the control center, notification information sent by the terminal after the items corresponding to the to-be-merged collection are merged; and
updating, by the control center according to the received notification information, the state of the merging processing station where the terminal is located to be an idle state.

17. The method according to claim 16, further comprising:
estimating, by the control center for each of a plurality of terminals, a completion time for the turnover container according to item information uploaded by the terminal and item information of items in a turnover container being processed in a merging processing station where the terminal is located; and
controlling, according to the estimated completion time, the transporting device to transport another turnover container to the merging processing station after the turnover container is processed.

18. The method according to claim 16, further comprising:
receiving, by the control center, item information uploaded by the terminal, wherein the item information is item information obtained by the terminal and regarding items transferred from the turnover container to a seeding rack.

19. The method according to claim 18, further comprising:
controlling, for each of a plurality of terminals, the transporting device to transport a seeding rack in an idle state to a merging processing station where the terminal is located when the order information is sent to the terminal.

20. A computer-readable storage medium, comprising a computer program stored thereon, wherein the program, when executed by a processor, performs the following steps:
determining, by a control center for each of a plurality of to-be-merged collections, turnover containers storing items corresponding to the to-be-merged collection, and establishing a first correspondence between the determined turnover containers and the to-be-merged collection;

controlling a container supply line to provide the turnover containers;
controlling a transporting device to transport, for each of the turnover containers provided by the container supply line, the turnover container to a temporary storage region;
determining a second correspondence between the turnover containers transported by a transporting device and a temporary storage position in the temporary storage region;
in response to determining, according to the first correspondence and the second correspondence, that the turnover containers corresponding to the to-be-merged collection are transported to the temporary storage region, controlling the transporting device to transport the turnover containers to a merging processing station; and
performing merging for the to-be-merged collection.

* * * * *